United States Patent [19]
Drori

[11] 3,789,990
[45] Feb. 5, 1974

[54] STRAINER FOR LIQUID PIPE LINES
[76] Inventor: Mordeki Drori, 89 Zahal St., Kiron, Israel
[22] Filed: Nov. 10, 1971
[21] Appl. No.: 197,305

[30] Foreign Application Priority Data
Nov. 15, 1970 Israel.................................... 35651

[52] U.S. Cl................. 210/310, 210/313, 210/448, 210/488
[51] Int. Cl............................................. B01d 25/00
[58] Field of Search .... 210/310, 313, 446, 448, 488

[56] References Cited
UNITED STATES PATENTS
| | | | |
|---|---|---|---|
| 3,397,794 | 8/1968 | Toth et al. | 210/446 X |
| 3,355,021 | 11/1967 | Jones | 210/446 X |
| 3,048,276 | 8/1962 | Darnell | 210/488 X |
| 1,496,771 | 6/1924 | Cash | 210/310 X |
| 327,646 | 10/1885 | Bingham, Jr. | 210/446 X |
| 2,305,351 | 12/1942 | Hellan | 210/313 X |

Primary Examiner—Samih N. Zaharna
Assistant Examiner—Richard W. Burks
Attorney, Agent, or Firm—Benjamin J. Barish

[57] ABSTRACT

The invention relates to a strainer for fluid pipe lines containing a filter element coaxial with the pipe line and a fluid deflector. The latter causes the incoming fluid first to flow around the filter element in a direction substantially parallel to its axis and thereafter to flow perpendicular through it and out of its downstream end.

The filter element is constituted by a plurality of juxtaposed grooved washers.

8 Claims, 2 Drawing Figures

PATENTED FEB 5 1974　　　　　　　　　　　　　　　3,789,990

STRAINER FOR LIQUID PIPE LINES

The present invention concerns pipe line strainers or filters which are used in pipe lines carrying fluids such as water, petroleum, foodstuffs, chemicals, gases or the like, with a view to remove dirt or other entrainment therefrom.

The known strainers generally comprise a cylindrical filter element of plastic or metal mesh which is inserted into the pipe line at an angle in such a manner that the oncoming fluid is forced against the wall of the screen mesh and then flows through it into the continuation of the pipe line. A trap or sump is provided at the bottom of the screen from which the accumulated dirt can be removed from time to time.

These strainers have a number of serious drawbacks. Their filter elements wear out quickly since they are disposed in the direct path of the inflowing fluid. This fact also causes clogging of the filter element, reducing the efficiency of the strainer very quickly even at the beginning of operation of the strainer and forcing the fluid to find a path through other parts of the filter. Cleaning of the filter can only be effected when the element is removed from the strainer housing and this removal is a complicated procedure, entrailing in many cases the entire dismantling of the strainer from the pipe line.

It is the object of the invention to provide a strainer whose efficiency is substantially the same throughout its operation.

It is a further object of the present invention to provide a strainer for fluid pipe lines in which the flow of the fluid is deflected, before it flows through the filter element in such a manner that it does not hit the filter element at an angle but flows parallel to its axis all around its cylindrical filtering surface and thereby can flush said surface continuously so that little clogging can occur.

It is a further object of the present invention to provide a strainer which can be cleaned quickly and easily without removing the entire strainer from the pipe line.

It is still a further object of the present invention to provide a strainer which takes up little space beyong the confines of the pipe itself.

The invention consists in a strainer for fluid lines in which the filter element is coaxial with the pipe line, and a coaxial fluid deflector is provided upstream of the upstream end of the filter element in such a manner that the incoming fluid is deflected and made to flow around the filter element substantially parallel to its axis before it flows perpendicularly through it and out of its downstream end.

More particularly, the novel strainer or filter comprises an inner rigid supporting body and pipe connecting means fixed to both its ends for connecting same to the two fluid pipes. The filter is supported around the rigid supporting body. An outer tubular housing is removably supported on the inner body and radially spaced therefrom and the filter to define an outer axial passageway between the external face of the filter and the internal face of the housing. The inner rigid supporting body is formed with an inner axial passageway, and is further formed with a radial passageway in the portion thereof occupied by the filter, the radial passageway, effecting communication between the outer and inner axial passageways via the filter. A deflector closes the inner axial passageway of the inner supporting body at one end and thereby forces the fluid to flow from the upstream pipe serially through one axial passageway, the filter, the radial passageway, and the other axial passageway before reaching the downstream pipe.

An important feature of the invention is that the inner rigid supporting body, and the pipe connecting means carried at the opposite ends thereof, effect a rigid mechanical connection between the two pipes independently of the housing. Thus, the housing may be easily removed to enable cleaning the filter without disconnecting the two pipes. In addition, the housing may be made of inexpensive plastic material since it is not required to withstand the axial load to which the strainer is subjected by the two fluid pipes.

The filter element may be constituted by a plurality of juxtaposed grooved washers, as known per se, or by a screen mesh.

Owing to this construction, the fluid as it flows into the strainer does not impinge directly on the filter element but first flows around it, so that the impurities will not become entrained in the filter-element and clog it but will continuously be flushed away by further fluid. Also, the housing may be easily removed to enable cleaning the filter without disconnecting the two pipes, as described above.

The invention is illustrated, by way of example only, in the accompanying drawings, in which.

Figure 1:
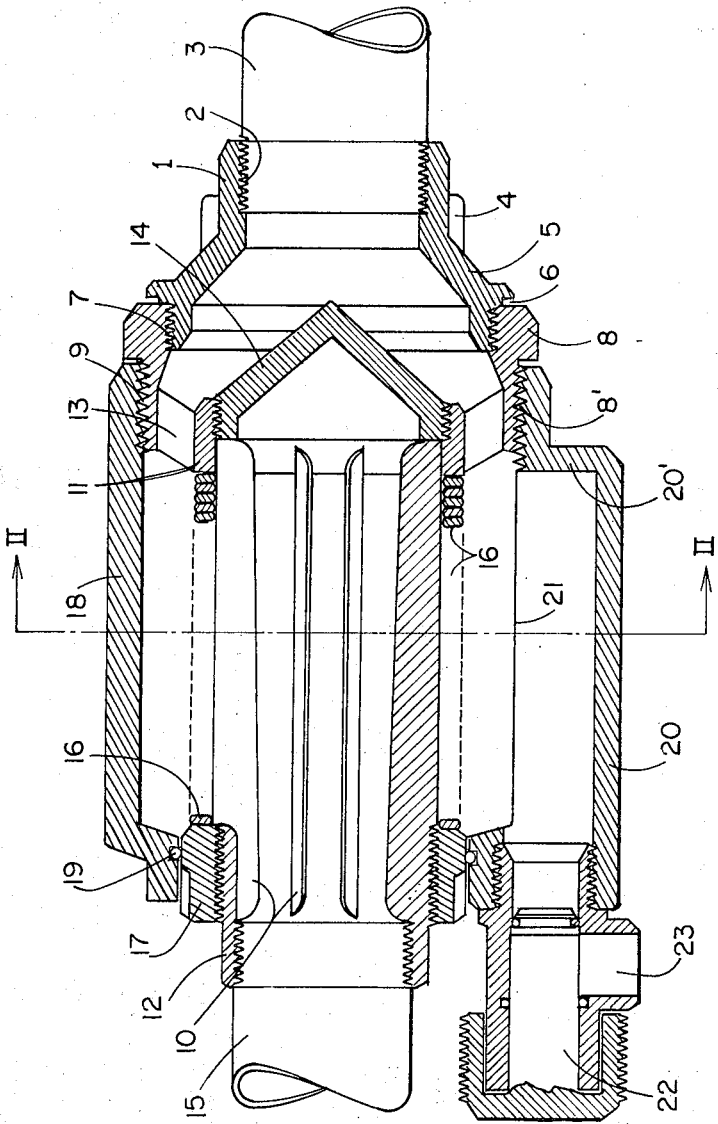
FIG. 1 is a longitudinal section of a strainer according to the invention attached to a pipeline.
Figure 2:
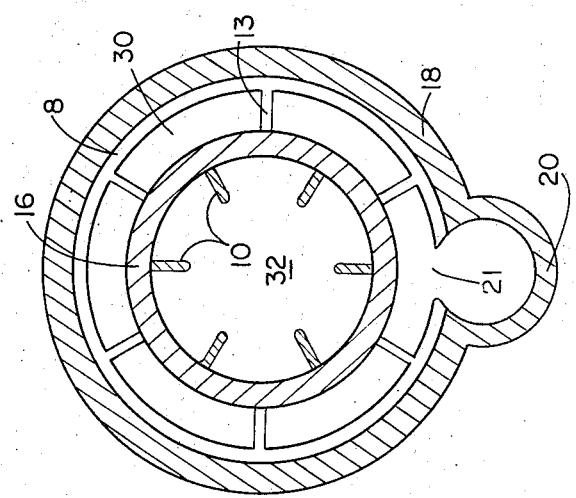
FIG. 2 is a cross-section thereof taken on line II—II of FIG. 1.

The strainer here illustrated comprises a socket 1 having an internal screw-thread 2 for attaching the strainer by screwing onto a horizontally extending inlet pipe 3, ribs 4 being provided on its outer surface to facilitate the turning of the socket. The walls of the socket flare outwardly at 5 and are undercut at their ends to provide a shoulder 6 and perpendicular thereto a threaded surface 7 to which the annular upstream end 8 of the filter-supporting body 9 is screwed. This body is constituted by elongated, axially extending, radially spaced ribs 10 which are integral with the internal surface of an annulus 11 at their upstream end and integral with a sleeve 12 at their trailing end, the external diameter of sleeve 12 being substantially equal with the internal diameter of annulus 11, so that the latter projects radially beyond the ribs 10. Annulus 11 is integral with upstream end 8 by means of a number of radially spaced ribs 13 and has an internal screw-thread near its upstream end for the attachment by screwing of a conical deflector 14 which is coaxial with and faces the inlet pipe 3. The downstream or trailing end of sleeve 12 is internally threaded to receive the threaded end of the outlet pipe 15.

A cylindrical filter element 16 composed of a plurality of grooved washers tightly juxtaposed, as known per se, is supported on ribs 10 and abuts annulus 11. A cylindrical mesh-screen likewise as known per se, may replace filter element 16, if desired. The filter element is held in place by a retaining ring 17 attached by screwing to the outside of sleeve 12.

A substantially cylindrical housing 18 is attached by screwing with its upstream end to an undercut externally threaded part 8' of upstream end 8 of filter-supporting body 9. The downstream end of housing 18 is of reduced diameter and abuts with its internal periphery the external periphery of ring 17, an O-ring 19 housed within an annular groove in ring 17 providing a seal.

Housing 18 is integral with a co-axial substantially cylindrical sump 20 which is in communication with the interior of the housing by means of an opening 21 extending axially over the entire length of the filter 16. Sump 20 is closed at the upstream end of the strainer by an integral wall 20' and at the downstream end of the strainer is provided with a cock 22 having a large downwardly extending outlet opening 23. Further O-rings are provided in the assembly of the strainer wherever a tight seal is required, as known per se.

Thus, it will be seen that body 9, including its radial ribs 13, annulus, 11, axial ribs 10, sleeve 12 and retaining ring 17, together form an inner rigid supporting body effecting a rigid mechanical connection between the upstream pipe 3 and the downstream pipe 15. This rigid mechanical connection is independent of housing 18, and therefore the housing may be removed to enable cleaning the filter elements 16 without disconnecting the two pipes from the rigid supporting body. This greatly facilitates cleaning of the filter. In addition, since housing 18 does not have to withstand the axial load between the two pipes (e.g. resulting from the expansion and contraction of the pipes arising from temperature changes), the housing may be made of inexpensive (e.g. plastic) material.

It will further be seen that the cone-shaped deflector 14 directs the fluid to flow from the up-stream pipe 3 through the space between ribs 13 to the outer axial passageway 30 between the external face of filter 16 and the internal face of housing 18. The fluid is then directed to flow serially through the filter 16, the radial passageways formed by the spaces between axial ribs 10 of the inner rigid supporting body, and then through axial passageway 32 formed through the inner rigid supporting body before finally reaching the downstream pipe 15.

The fluid flowing from pipe 3 is deflected by deflector 14 and is made to flow by way of ribs 13 all around filter element 16 and through it to outlet pipe 15. Any impurities which are momentarily deposited on the outer surface of the filter element are continuously flushed away therefrom by the flowing fluid in a self-flushing action and drop by gravity through opening 21 into sump 20. After a quantity of impurities has accumulated in the sump, cock 22 is opened to permit the fluid to flush them out through outlet opening 23.

If impurities become entrained on the surface of the filter element 16, the latter can be easily cleaned by removing housing 18 from body 9 by unscrewing and sliding the housing onto pipe 15, whereby the filter element is exposed and can be brushed clean, without removing the entire strainer from its connection with the pipes 3 and 15. A removal of ring 17 by unscrewing it from sleeve 12 will permit a flushing of the grooved washers of filter element 16 in case the grooves of said washers become clogged.

If desired, the cock 22 can be automatically operated by any known means after a predetermined time period or a predetermined density of the impurities which have collected in the sump 20.

I claim:

1. A strainer connectable between two fluid pipes, comprising: an inner rigid supporting body; pipe connecting means fixed to said inner body at both ends for connecting same to the two fluid pipes; a filter supported around said inner body; an outer tubular housing removably supported around said inner body and radially spaced therefrom and the filter supported thereby, to define an outer axial passageway between the external face of the filter and the internal face of the housing; said inner supporting body being formed with an inner axial passageway, and being further formed with a radial passageway in the portion thereof occupied by said filter, the radial passageway effecting communication between said outer and inner axial passageways via said filter; and a deflector closing the inner axial passageway of the inner supporting body at one end and forcing the fluid to flow from the upstream pipe serially through one axial passageway, the filter, the radial passageway, and the other axial passageway before reaching the downstream pipe; said inner rigid supporting body and said pipe connecting means carried at the opposite ends thereof effecting a rigid mechanical connection between said two pipes independently of said housing whereby the housing may be removed to enable cleaning the filter without disconnecting the two pipes.

2. A strainer as defined in claim 1, wherein the upstream end of the inner rigid supporting body includes an annular ring of larger diameter than the remainder of the supporting body and fixed thereto by a plurality of angularly-spaced, radially-extending ribs, the space between said ribs providing communication from the upstream pipe to said outer axial passageway.

3. A strainer as defined in claim 2, wherein said deflector comprises a cone-shaped member threadedly received in the up-stream end of the inner rigid supporting body closing said end thereof and thereby directing the fluid to flow from the upstream pipe through the space between the ribs to the outer axial passageway.

4. A strainer as defined in claim 1, wherein one end of said outer tubular housing is threadely received on one end of the inner rigid supporting body, the opposite end of the housing being unattached to the opposite end of the body but sealed with respect thereto by a sealing ring.

5. A strainer as defined in claim 1, wherein said inner rigid supporting body includes annular end portions at each end integrally joined with an intermediate portion, the latter being formed with a plurality of said radial passageways.

6. A strainer as defined in claim 5, wherein said intermediate portion of the inner rigid supporting body includes a plurality of axially extending ribs angularly spaced from each other, the spaces between said latter ribs defining said radial passageways.

7. A strainer as defined in claim 1, wherein said filter comprises a plurality of grooved annular washers supported by said inner rigid supporting body.

8. A strainer as defined in claim 1, wherein said outer tubular housing includes a sump at the bottom thereof and extending parallel to the axis of the housing, said outer axial passageway communicating with said sump over substantially the complete length of said filter, the downstream end of the sump being closed by an axially movable cock.

* * * * *